Figure 1:
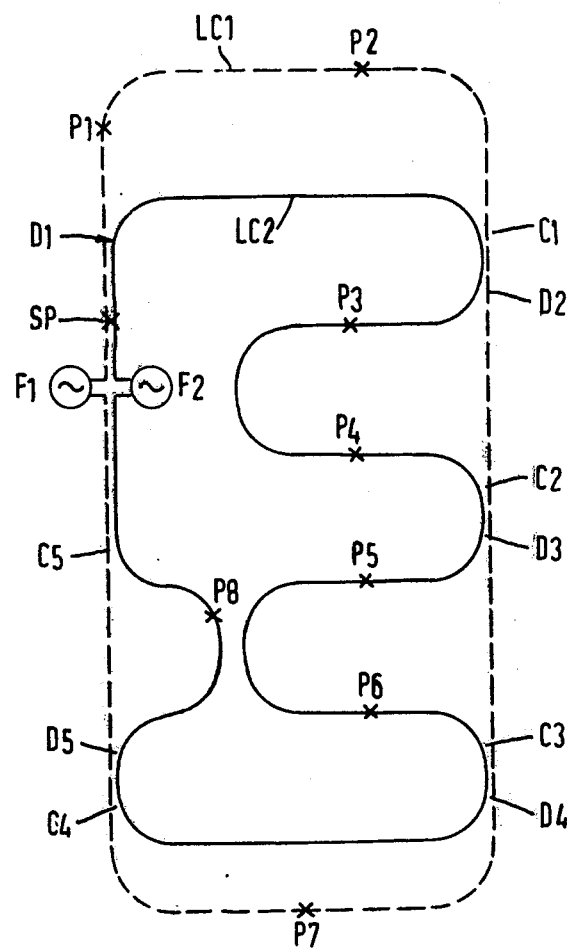

United States Patent [19]
Waites

[11] 4,010,409
[45] Mar. 1, 1977

[54] AUTOMATIC VEHICLE GUIDANCE SYSTEMS

[75] Inventor: Stephen Peter Waites, Maidenhead, England

[73] Assignee: EMI Limited, Hayes, England

[22] Filed: July 31, 1973

[21] Appl. No.: 384,171

[30] Foreign Application Priority Data

Aug. 2, 1972 United Kingdom ............ 36070/72

[52] U.S. Cl. ................................ 318/587; 318/16; 318/608; 318/562
[51] Int. Cl.² .................................. G05B 19/100
[58] Field of Search ............ 318/16, 587, 608, 562

[56] References Cited
UNITED STATES PATENTS

| | | | |
|---|---|---|---|
| 3,587,100 | 6/1971 | Doremus | 318/16 X |
| 3,669,208 | 6/1972 | Brooke | 318/587 X |
| 3,669,209 | 6/1972 | Brooke | 318/587 X |
| 3,768,586 | 10/1973 | Thompson et al. | 318/587 X |

Primary Examiner—B. Dobeck
Attorney, Agent, or Firm—Fleit & Jacobson

[57] ABSTRACT

In a frequency selective steering system for automatic vehicle guidance, a phase locked loop is used to derive from a sum signal containing wanted and unwanted signal frequencies a reference signal equal in phase and frequency to the wanted signal. The reference signal is used to derive from a difference signal also containing wanted and unwanted signal frequencies an error signal dependent on the phase of the wanted signal only. The error signal is used to control the steering of the vehicle.

5 Claims, 2 Drawing Figures

AUTOMATIC VEHICLE GUIDANCE SYSTEMS

This invention relates to automatic vehicle guidance systems and particularly to frequency selective steering apparatus for use in such a system.

Automatic vehicle guidance systems have been proposed in which the route to be followed by a vehicle is defined by a leader cable to which an alternating current is applied and the vehicle is provided with sensing means responsive to the current in the cable. For example two pick-up coils may be mounted at the front of the vehicle one on either side of the steered wheel, the steering system responding to differences between the signals picked up by the two coils to tend to reduce the differences. One such steering system is described in our British Pat. No. 1,097,141 in which the signals from the two coils are subtracted to provide a steering error signal whose magnitude is proportional to the magnitude of the steering error and whose phase is dependent on the direction of the error. The two signals are also added to produce a signal of reference phase which is used to demodulate the error signal.

When several routes are to be provided, it has been proposed to define each route by a separate leader cable, each cable being energised at a different frequency. Such a system is described in British Pat. No. 549,674. In order that the vehicle may follow the correct route it is necessary to make the vehicle's steering system responsive only to the frequency of the current in the cable to be followed. One method proposed in British Pat. No. 549,674 is to tune the pick-up coils to the desired frequency. Alternatively, a filter which passes the desired frequency and rejects all other may be used.

Restrictions are normally imposed on the range of frequencies used in automatic vehicle guidance systems, in order to avoid interfering with other apparatus. Therefore if the frequencies used are well spaced apart, the number of frequencies which can be used, and hence the number of routes, is limited. The number of routes is still further reduced if certain frequencies are reserved for sending messages between the vehicle and a control point. The obvious solution would seem to be to increase the number of frequencies by reducing the spacing between them. However this would require highly selective filters to reject the adjacent unwanted frequencies and it is difficult to achieve phase matching of such filters. As has already been mentioned, the phase of the steering error signal is important in determining the direction of the error, and consequently any phase errors introduced by the filters seriously affect the steering. For this reason it is usually preferable to use well spaced frequencies and to accept the limitation on the number of routes.

It is the object of this invention to provide a vehicle guidance system of the frequency selective type in which the frequencies may be close together and which does not require highly selective filters.

According to the invention there is provided an automatic vehicle guidance system comprising at least two leader cables, capable of being energised with alternating current of different frequencies and defining different routes to be followed by a vehicle or vehicles, and at least one vehicle having a. sensing means responsive to the current in said cables,
b. means for deriving from said sensing means first and second signals each containing frequency components dependent on alternating currents present in the cables being sensed wherein the phase of said first signal is dependent on the direction of displacement of said vehicle from said cables and the phase of said second signal is substantially independent of displacement,
c. oscillation generating means,
d. selection means for deriving from said oscillation generating means an oscillation signal whose frequency is substantially equal to that of the cable to be followed,
e. phase control means responsive to said second signal for maintaining said oscillation signal in a predetermined phase relationship with that component of said second signal whose frequency is the same as that of said oscillation signal,
f. comparison means, responsive to said first signal and to said oscillation signal, including,
  i. a first phase sensitive detector having an output signal comprising a D.C. component, due to phase differences between said oscillation signal and a first component, of said first signal, whose frequency is the same as that of said oscillation signal, and one or more A.C. components, due to frequency differences between said oscillation signal and the remaining components of said first signal, and
  ii. means for separating said D.C. component from said A.C. components to derive an error signal whose sense is dependent only on the phase relationship between said oscillation signal and said first component, and
g. control means responsive to said error signal for reducing the displacement of said vehicle from the cable to be followed.

Figure 2:
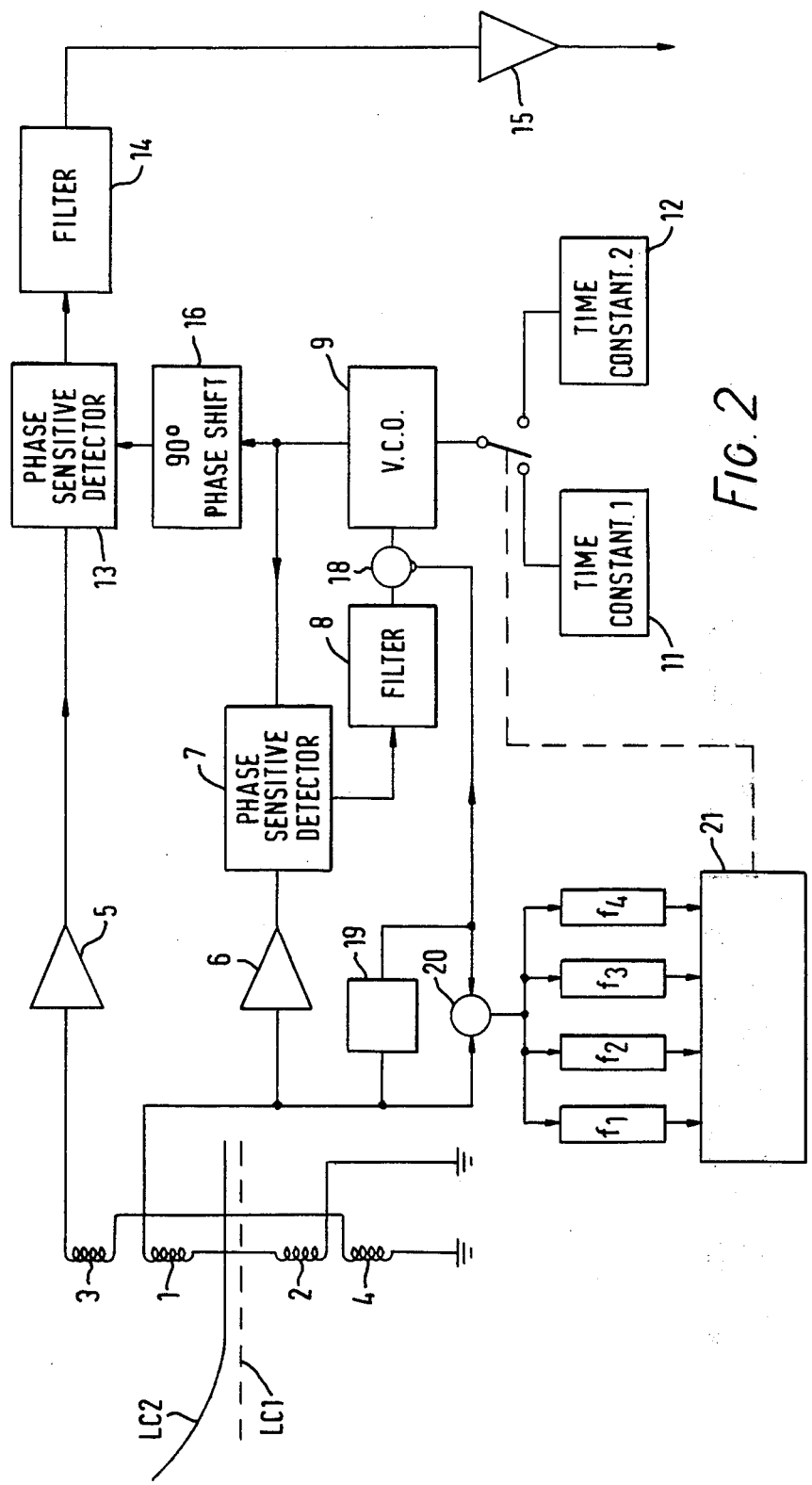

In order that the invention may be clearly understood and readily carried into effect it will now be described with reference to the accompanying drawings, of which:

FIG. 1 shows a lay-out of the leader cables in a frequency selective guidance system, and FIG. 2 is a block diagram of a control system in accordance with the invention.

Referring first to FIG. 1, this shows the lay-out of a two route system, the first route being defined by a leader cable LC1 energised at frequency F1, and the second by a leader cable LC2 energised at frequency F2. As can be seen, the two routes diverge at points D1, D2 . . . D5 and converge at points C1, C2 . . . C5. Between convergence and divergence points such as C5 and D1 the two routes are common and the cables are parallel and close together. If, as is usual, the cables are laid in slots in the ground or floor, the parallel sections of the two cables may conveniently be laid in the same slot. Points along the routes at which the vehicles may be required to stop are indicated at P1, P2 . . . P8 and each vehicle is programmed to follow the shortest route including all the points at which it is to stop. For example if a vehicle is to stop at points P3, P7 and P8, its shortest route from starting point SP and travelling clockwise is along LC2 to point D3, along LC1 from D3 to D5, and along LC2 from D5 to the starting point. The programme means may be carried by the vehicle or may be located at a central point as will be later described.

As has already been mentioned, in order that a vehicle may follow a particular cable, it is necessary for its control system to discriminate between signals from the cable and signals from adjacent cables. Although, in the interests of simplicity, only two cables are shown in practice a larger number may be used.

Referring now to FIG. 2, the means for sensing the current in the leader cable LC1 and LC2 comprises a first pair of pick up coils 1 and 2 and a second pair of pick up coils 3 and 4. These coils are normally mounted at the front of the vehicle and on opposite sides of the centre line of the vehicle. Therefore when the vehicle is centred on the cables LC1 and LC2 as shown in FIG. 2, the signals picked up by the coils 1 and 2 are equal, as also are the signals picked up by coils 3 and 4. However if the vehicle were to deviate to the right (upwards in the drawing) the signals picked up by coils 2 and 4 would increase as the coils moved closer to the cables, and the signals picked up by coils 1 and 3 would decrease. Coils 1 and 2 are connected in series to produce a sum signal whose amplitude and phase are substantially constant despite deviations of the vehicle, provided the deviations are not too great. Coils 3 and 4 are connected in series opposition to produce a difference signal whose amplitude is proportional to the extent of the deviation and whose phase is dependent on the direction of deviation. That is to say, for deviation to one side of the cables the difference signal is in phase with the sum signal and for deviation to the other side the difference signal is opposite in phase to the sum signal. Instead of using four coils, the sum and difference signals may be produced by adding and subtracting the signals from only two coils. The sum signal is amplified by an amplifier 6 which may be an operational amplifier with A.G.C., and applied to a phase sensitive detector 7. Assuming that the vehicle is approaching diversion point D1, the coils 1 to 4 pick up signals from both cables LC1 and LC2. The sum signal therefore includes components of frequencies F1 and F2 and also beat frequencies. In order that the vehicle may follow one particular cable in this case LC2, when it reaches a diversion D1, it is necessary to select the frequency component F2 to the exclusion of all others. The frequency selected, and hence the cable to be followed, is determined by a voltage controlled oscillator 9 which may be caused to oscillate at any selected frequency by providing different time constant circuits such as 11 and 12 which can be selectively connected to the oscillator 9 by a switch 17 controlled by the programme means. Although switch 17 is shown as a mechanical switch for convenience, semiconductor switches are preferable. Also, instead of using a single oscillator with a number of time constant circuits, a separate oscillator could be provided for each different frequency.

Assuming that the time constant circuit 12 has been connected to the oscillator 9 to cause it to oscillate at frequency F2, the oscillator output is applied to the phase sensitive detector 7 to which the sum signal from amplifier 6 is also applied. The phase sensitive detector may be of any known type and produces an output signal dependent on phase and frequency differences between the two input signals. As the sum signal includes several frequency components including F1 and F2, the ouput from the phase sensitive detector also contains several components, namely a D.C. signal dependent on the phase difference between the oscillator output of frequency F2 and the F2 component of the sum signal, and several A.C. signals dependent on the frequency differences between the oscillator output and the other components of the sum signal. The output from the phase sensitive detector is applied via a filter 8 which passes only the D.C. component, to oscillator 9 where it is used to adjust the phase of the oscillator to reduce the phase difference. That is to say, 7, 8 and 9 form a so-called phase-locked loop which acts to maintain a predetermined phase relationship, normally a phase quadrature relationship, between the oscillator output and the F2 component of the sum signal. The phase locked output from the oscillator is shifted in phase by 90° by means of phase shifter 16 to produce a signal in phase with the F2 component of the sum signal and applied together with the difference signal derived via coils 3 and 4 and an amplifier 5 which may be the same type as amplifier 6, to a second phase sensitive detector 13 which may be the same as detector 7. As the difference signal includes several components of different frequencies the output from phase sensitive detector 13 contains a D.C. signal due to the F2 component of the difference signal and several A.C. components due to the frequency differences between the oscillator signal and the other components of the difference signal, and the D.C. signal is separated from the A.C. signals by the filter 14. As already mentioned, the difference signal is in phase with the sum signal when the vehicle deviates to one side of the cable and opposite in phase when the vehicle deviates to the other side. The oscillator output is in phase quadrature with the selected sum signal, therefore the output from phase shifter 16 is always in phase or phase opposition with the difference signal. Consequently the D.C. signal from filter 14 has one polarity when the difference signal is in phase with, and the opposite polarity when the difference signal is opposite in phase to, the phase shifted oscillator signal. Moreover the amplitude of the D.C. signal is proportional to the amplitude of the difference signal. The output from filter 14 therefore represents in amplitude and polarity, the extent and direction of any deviation of the vehicle from cable LC2 but is independent of deviation from cable LC1, and can be used in any suitable manner to correct such deviation. For example, as described in British Pat. No. 1,097,141 the signal may be applied to two channels. In the first channel the mark-space ratio of a multivibrator is controlled in accordance with the amplitude of the D.C. signal but regardless of its polarity. In the second channel gating signals are derived in accordance with the polarity of the D.C. signal and used to selectively apply the multivibrator output to the left or right steering motor depending on the polarity.

Returning to FIG. 2, it can be seen that the phase-locked loop 7, 8, 9 effectively extracts from the complex sum signal the component of the desired frequency F2. This is the component required as a phase reference signal. Using this reference signal, phase shifter 16, phase sensitive detector 13 and filter 14 extract from the complex difference signal the component of the desired frequency F2 and demodulates it. Although the system includes two filters, 8 and 14, these filters are required only to separate a D.C. signal from A.C. signals. Such filters are much simpler than highly selective filters and do not involve phase matching problems. Also, the frequencies used can be close together.

There has been described how a vehicle travelling along cables LC1 and LC2 towards a diversion point D1 is caused to lock its steering control system to the frequncy F2 of cable LC2. Therefore when the vehicle reaches D1 it continues to follow LC2, ignoring the signals picked up from LC1. The vehicle continues to follow LC2 until it passes the convergence point C2. When it reaches the next divergence point D3 it is required to follow cable LC1. As cables LC1 and LC2 are adjacent between C2 and D3, it is permissible for the vehicle to switch from one cable to the other in this region without upsetting the steering control. This is done simply by switching the oscillator 9 from frequency F2 to frequency F1. The steering system then locks on to the F1 components of the signals picked up from the cables in the manner already described, and consequently the vehicle steers along cable LC1 up to and beyond diversion D3.

It was mentioned earlier that it may be desirable to reserve certain frequencies for sending messages between the vehicles and a control point. Although each vehicle could carry its own programme unit to select its route, as described in U.S Pat. No. 3,039,554 it is often more convenient to use a central control unit, such as a digital computer, to control all the vehicles. In such a system a programme for each vehicle would be fed into the computer, each programme indicating the points at which the vehicle in question is required to stop, e.g. for loading or unloading. The computer's task is to monitor the progress of each vehicle in the system, determine what action is necessary on the part of the vehicle, viz continue to follow the present course, switch frequency to another cable, stop at the next loading or unloading point, or stop to avoid a collision with another vehicle, and command the vehicle accordingly. A communication link between each vehicle and the central control is therefore necessary, and it is most convenient to use the one which already exists, namely the leader cable. It has been found that interuptions in the current in the leader cable do not aversely affect the steering of the vehicles provided the interruptions are only of short duration. During such interruptions, messages may therefore be passed between the vehicles and the control centre. In a typical case, the current is interrupted for a period of 10 ms every 30 ms and during each interruption one of four tones $f1, f2, f3$ and $f4$, is transmitted along the cables, each tone representing two binary bits, e.g. 01, 10, 11 and 00 respectively. The tone generator may comprise, for example, a class D type of oscillator with the transmission coil used to couple the output to the leader cables acting as the resonant inductor with one of four selected capacitors. The capacitors may be selectively switched according to the tone frequency to be transmitted, by means of S.C.R's on triacs, for example. Each tone need only last for 5 ms, the remaining 5 ms being allowed for the rise and fall of the signalling transients. The position of each vehicle in the system may be determined by placing markers, such as permanent magnets at points along the routes, and providing means such as a pick-up coil on each vehicle for detecting and counting the markers. Any other known type of marker, e.g. optical or mechanical may be used instead. Such methods are well known but in the present system it is not necessary for a vehicle to maintain a count of the total number of markers which is has passed. As each vehicle reports its position at regular intervals to the central control, it is only necessary for the vehicle to maintain a limited count, say a maximum of four. Each tug reports its marker count to the control centre at frequent intervals, say every five seconds in response to a command from the control centre. The command may consist of the binary code 00, 00, 00, which is represented by tone $f4$ transmitted in three successive interruption periods which will hereafter be called time slots. The command is transmitted along all the leader cables and is received by all the vehicles which then reply in sequence. Thus in time slot 4 vehicle 1 transmits its marker count by transmitting tone $f1, f2, f3$ or $f4$, representing counts of 1, 2, 3 and 4 respectively. Vehicle 2 replies in the same way in time slot 5, vehicle 3 in time slot 6 and so on. Assuming a total of 30 vehicles, the last vehicle replies in time slot 33. Following this, there is a period of 4 seconds before the vehicles are required to report again. During this period the control centre transmits instructions to the vehicles, based on their updated positions and the routes to be followed. However when a large number of vehicles is involved it is not practical to transmit instructions to all the vehicles during this 4 second interval, nor is it desirable to extend the interval between interrogations. To overcome this problem each vehicle is provided with a register which stores a received instruction which is valid for several interrogation cycles. During each interrogation cycle the control centre transmits instructions to only a small number of vehicles on a priority basis, for example to the eight vehicles whose current instructions are in most need of updating. The instruction, which is transmitted in the form of tone codes already described may include (a) the identity of the vehicle for which the instruction is intended, (b) the next steering frequency to be followed (c) whether the new instruction supercedes the current instruction or is to be carried out after the current instruction has expired (d) the marker count up to which the instruction is valid. For example, suppose the current instruction in the register is steering frequency F1 and marker count 3. This means that after switching to steering frequency F1 the vehicle is permitted to continue until count 3 is next achieved before the instruction expires. The vehicle must then stop if no new instruction has been received. However the vehicle will normally receive a new instruction before the current one expires. Suppose the new instruction is steering frequency F2 and marker count 4, and that the tug has already reached the marker count. If part (c) of the new instruction indicates that the new instruction supercedes the previous instruction the new instruction is applied to the "Current Instruction" part of the register where it cancels the previous instruction. The new instruction is then acted upon. However if part (c) of the new instruction indicates that is does not supercede the previous one, the instruction is applied to the "Next Instruction" part of the register, and is transferred to the "Current Instruction" part of the register only after the previous instruction has expired i.e. after the marker count has been reached.

The instruction transmitted to the vehicle may include further information which controls other functions of the vehicle e.g. the direction and speed of the vehicle, an instruction to stop for loading or unloading or to avoid a collision, an instruction to couple or uncouple trailers in the case of a trolley or to raise or lower forks in the case of a fork lift truck; an instruction to operate a warning horn or direction indicator, and so on.

Having received an instruction the vehicle automatically transmits a reply to the control centre, confirming details of the received instruction and reporting other useful information such as the cable frequency currently being followed, the speed and direction of travel, whether the vehicle is loaded or unloaded, the status of the battery power supply, and so on. From this information together with the marker count received in each interrogation cycle and the stored programme for the vehicle, the computer at the control centre determines the next instruction for the vehicle and its order of priority.

As the system includes a number of leader cables, each instruction is transmitted along all the cables. Similarly each vehicle transmits its replies along the cable or cables along which it is travelling. This enables a further check on the position of the vehicle to be made. For example if a reply from a particular vehicle is received along cables A, B, C and D, the computer knows that the vehicle is travelling along a section of the system where cables A, B, C and D are parallel. This may not define the position of the vehicle exactly, as there may be several such sections. However if the next reply is received along cables A and E this, together with the previous information may suffice to locate the vehicle.

During the transmission of messages, the steering coils 1, 2, 3 and 4 will pick up the message frequency tones, but as the steering system is locked to a different frequency it ignores the tone frequencies. However it is desirable to maintain control of the phase of oscillator 9 during the interruptions in the steering current and this may be done by storing the phase control signal from detector 7 and filter 8 e.g. by means of a capacitor. In addition, the detector may be disconnected from the oscillator by means of a gate 18 to prevent spurious signals from reaching the oscillator during the interruptions. The normally open gate 18 may be closed by the output from a detector 19 which detects the presence of a gap or interruptions in the sum signal from coils 1 and 2. The output from detector 19 may also be used to open a gate 20 to apply the coded frequencies, transmitted during the gaps, to a set of filters $f1, f2, f3$ and $f4$ which separate the four tones and apply them to a control unit 21 where they are decoded and stored. An output from control unit 21 controls the switch 17 in accordance with the received route instructions. As shown, the coded tones are sensed by coils 1 and 2 but a separate coil may be used instead.

The invention which has been described is applicable to any type of self-propelled vehicle, for example industrial tugs, fork lift trucks. In the case of tugs, each tug may be fitted at the rear with an automatic coupling device to enable trailers to be connected to the tug on reversing. The coupling device may be operated by impact, by an electromagnet, by a solenoid or by a motor, such devices being well known. It is important to control the steering of the vehicle when it is reversing and to this end a second set of pick-up coils similar to 1, 2, 3 and 4 may be mounted at the rear of the vehicle and switching means provided to connect the rear coils to the inputs of amplifiers 5 and 6.

It will be appreciated that the invention is not limited to a centrally controlled system. It is equally applicable to a system in which each vehicle carries its own control programme. Also the centrally controlled system described above is only one example, and many modifications and alternatives will be obvious to those skilled in the art. For example means other than the leader cables may be used for messages communication e.g. radio on a separate conductor. Also, instead of time division multiplexing, frequency multiplexing may be used particularly when the number of vehicles is small.

What I claim is:

1. An automatic vehicle guidance system comprising at least two leader cables, capable of being energised with alternating current of different frequencies and defining different routes to be followed by a vehicle or vehicles, and at least one vehicle having
   a. sensing means responsive to the current in said cables,
   b. means for deriving from said sensing means first and second signals each containing frequency components dependent on alternating currents present in the cables being sensed wherein the phase of said first signal is dependent on the direction of displacement of said vehicle from said cables and the phase of said second signal is substantially independent of displacement,
   c. oscillation generating means, comprising a voltage control oscillator having a number of time constant circuits,
   d. selection means for deriving from said oscillation generating means an oscillation signal, whose frequency is substantially equal to that of the cable to be followed, by selectively connecting one of said time constant circuits to said voltage control oscillator,
   e. phase control means responsive to said second signal for maintaining said oscillation signal in a predetermined phase relationship with that component of said second signal whose frequency is the same as that of said oscillation signal,
   f. comparison means, responsive to said first signal and to said oscillation signal, including
      i. a first phase sensitive detector having an output signal comprising a D.C. component, due to phase differences between said oscillation signal and a first component, of said first signal, whose frequency is the same as that of said oscillation signal, and one or more A.C. components, due to frequency differences between said oscillation signals and the remaining components of said first signal, and
      ii. means for separating said D.C. component from said A.C. components to derive an error signal whose sense is dependent only on the phase relationship between said oscillation signal and said first component, and
   g. control means responsive to said error signal for reducing the displacement of said vehicle from the cable to be followed.

2. An automatic vehicle guidance system comprising at least two leader cables, capable of being energised with alternating current of different frequencies and defining different routes to be followed by a vehicle or vehicles, and at least one vehicle having
   a. sensing means, including a first pair of inductive pick-up coils connected in series and a second pair of inductive pick-up coils connected in series opposition, to be responsive to the current in said cables,
   b. means for deriving from said sensing means first and second signals each containing frequency components dependent on alternating currents present in the cables being sensed wherein the phase of said first signal is dependent on the direction of displacement of said vehicle from said cables and the phase of said second signal is substantially independent of displacement, c. oscillation generating means,
d. selection means for deriving from said oscillation generating means an oscillation signal whose frequency is substantially equal to that of the cable to be followed,
e. phase control means responsive to said second signal for maintaining said oscillation signal in a predetermined phase relationship with that component of said second signal whose frequency is the same as that of said oscillation signal,
f. comparison means, responsive to said first signal and to said oscillation signal, including
  i. a first phase sensitive detector having an output signal comprising a D.C. component, due to phase differences between said oscillation signal and a first component, of said first signal, whose frequency is the same as that of said oscillation signal, and one or more A.C. components, due to frequency differences between said oscillation signal and the remaining components of said first signal, and
  ii. means for separating said D.C. component from said A.C. components to derive an error signal whose sense is dependent only on the phase relationship between said oscillation signal and said first component, and
g. control means responsive to said error signal for reducing the displacement of said vehicle from the cable to be followed.

3. An automatic vehicle guidance system comprising: at least two leader cables, capable of being energised with alternating current of different frequencies and defining different routes to be followed by a vehicle or vehicles; at least one vehicle having
  a. sensing means responsive to the current in said cables,
  b. means for deriving from said sensing means first and second signals each containing frequency components dependent on alternating currents present in the cables being sensed wherein the phase of said first signal is dependent on the direction of displacement of said vehicle from said cables and the phase of said second signal is substantially independent of displacement,
  c. oscillation generating means,
  d. selection means, responsive to a programme control unit located at a control point remote from said vehicle, for deriving from said oscillation generating means an oscillation signal whose frequency is substantially equal to that of the cable to be followed,
  e. phase control means responsive to said second signal for maintaining said oscillation signal in a predetermined phase relationship with that component of said second signal whose frequency is the same as that of said oscillation signal,
  f. comparison means, responsive to said first signal and to said oscillation signal, including
    i. a first phase sensitive detector having an output signal comprising a D.C. component, due to phase differences between said oscillation signal and a first component, of said first signal, whose frequency is the same as that of said oscillation signal, and one or more A.C. components, due to frequency differences between said oscillation signal and the remaining components of said first signal, and
    ii. means for separating said D.C. component from said A.C. components to derive an error signal whose sense is dependent only on the phase relationship between said oscillation signal and said first component, and
  g. control means responsive to said error signal for reducing the displacement of said vehicle from the cable to be followed;
means for periodically interrupting the current in said leader cables;
and means for transmitting commands from said programme control unit to said vehicle along said leader cables during said interruptions.

4. An automatic vehicle guidance system comprising: at least two leader cables, capable of being energised with alternating current of different frequencies and defining different routes to be followed by a vehicle or vehicles; at least one vehicle having
  a. sensing means responsive to the current in said cables,
  b. means for deriving from said sensing means first and second signals each containing frequency components dependent on alternating currents present in the cables being sensed wherein the phase of said first signal is dependent on the direction of displacement of said vehicle from said cables and the phase of said second signal is substantially independent of displacement,
  c. oscillation generating means,
  d. selection means, responsive to a programme control unit located at a control point remote from said vehicle, for deriving from said oscillation generating means an oscillation signal whose frequency is substantially equal to that of the cable to be followed,
  e. phase control means responsive to said second signal for maintaining said oscillation signal in a predetermined phase relationship with that component of said second signal whose frequency is the same as that of said oscillation signal,
  f. comparison means, responsive to said first signal and to said oscillation signal, including
    i. a first phase sensitive detector having an output signal comprising a D.C. component, due to phase differences between said oscillation signal and a first component, of said first signal, whose frequency is the same as that of said oscillation signal, and one or more A.C. components, due to frequency differences between said oscillation signal and the remaining components of said first signal, and
    ii. means for separating said D.C. component from said A.C. components to derive an error signal whose sense is dependent only on the phase relationship between said oscillation signal and said first component, and
  g. control means responsive to said error signal for reducing the displacement of said vehicle from the cable to be followed;
means for periodically interrupting the current in said leader cables;
and means for transmitting information from said vehicle to said programme control unit along said leader cables during said interruptions.

5. An automatic vehicle guidance system according to claim 4, wherein at least part of said information relates to the position of said vehicle to enable said programme control unit to monitor the position of said vehicle.

* * * * *